United States Patent
Otashiro et al.

(10) Patent No.: US 12,091,591 B2
(45) Date of Patent: Sep. 17, 2024

(54) ADHESIVE POLYORGANOSILOXANE COMPOSITION

(71) Applicant: MOMENTIVE PERFORMANCE MATERIALS JAPAN LLC, Tokyo (JP)

(72) Inventors: Koki Otashiro, Tokyo (JP); Koji Miyata, Tokyo (JP); Masanori Takanashi, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 595 days.

(21) Appl. No.: 17/417,580

(22) PCT Filed: Dec. 23, 2019

(86) PCT No.: PCT/JP2019/050385
§ 371 (c)(1),
(2) Date: Jun. 23, 2021

(87) PCT Pub. No.: WO2020/137984
PCT Pub. Date: Jul. 2, 2020

(65) Prior Publication Data
US 2022/0056326 A1 Feb. 24, 2022

(30) Foreign Application Priority Data

Dec. 25, 2018 (JP) .................... 2018-241003

(51) Int. Cl.
*C08G 77/20* (2006.01)
*C08G 77/08* (2006.01)
*C09J 11/04* (2006.01)
*C09J 183/06* (2006.01)
*C08G 77/00* (2006.01)

(52) U.S. Cl.
CPC ............ *C09J 183/06* (2013.01); *C08G 77/08* (2013.01); *C08G 77/20* (2013.01); *C09J 11/04* (2013.01); *C08G 77/70* (2013.01)

(58) Field of Classification Search
CPC ........ C09J 183/06; C09J 11/04; C09J 183/04; C08G 77/08; C08G 77/20; C08G 77/12; C08K 3/04; C08K 5/5425; C08K 5/5435; C08K 5/5445; C08K 9/06; C08K 3/013; C08K 5/0091; C08K 5/541; C08K 5/5419; C08K 5/56; C08L 83/04; C08L 2205/025

USPC ............................................. 524/588
See application file for complete search history.

(56) References Cited

U.S. PATENT DOCUMENTS

| | | | |
|---|---|---|---|
| 5,882,467 A * | 3/1999 | Sierawski | C08K 3/22 524/114 |
| 8,389,650 B2 | 3/2013 | Takanashi et al. | |
| 9,303,164 B2 | 4/2016 | Takanashi | |
| 2010/0190396 A1 | 7/2010 | Nozoe et al. | |
| 2010/0208189 A1 | 8/2010 | Takanashi | |
| 2013/0065999 A1 | 3/2013 | Takanashi | |
| 2015/0337189 A1 | 11/2015 | Takanashi et al. | |
| 2019/0161666 A1 | 5/2019 | Tanigawa et al. | |
| 2021/0130615 A1 | 5/2021 | Hirakawa et al. | |
| 2021/0147633 A1 | 5/2021 | Tanigawa et al. | |
| 2021/0147681 A1 | 5/2021 | Hirakawa et al. | |
| 2021/0147738 A1 | 5/2021 | Takanashi et al. | |

FOREIGN PATENT DOCUMENTS

| | | |
|---|---|---|
| JP | H02269771 A | 11/1990 |
| JP | 2006257355 A | 9/2006 |
| JP | 2018095796 A | 6/2018 |
| JP | 2018123310 A | 8/2018 |
| WO | 2008020635 A1 | 2/2008 |

OTHER PUBLICATIONS

U.S. Appl. No. 17/293,302, First Named Inventor: Masanori Takanashi; Title: "Adhesive Polyorganosiloxane Composition"; Filed: May 12, 2021.
International Search Report (ISR) (and English translation thereof) dated Mar. 17, 2020 issued in International Application No. PCT/JP2019/050385.
Written Opinion dated Mar. 17, 2020 issued in International Application No. PCT/JP2019/050385.

* cited by examiner

*Primary Examiner* — Hannah J Pak
(74) *Attorney, Agent, or Firm* — Holtz, Holtz & Volek PC

(57) ABSTRACT

An adhesive polyorganosiloxane composition includes, at a specific composition ratio: (A) a linear polyorganosiloxane containing an alkenyl group including a low-viscosity linear polyorganosiloxane containing an alkenyl group; (B) a polyorganosiloxane containing at least three alkenyl groups in the molecule; (C1) a polyorganohydrogensiloxane having 3 or more hydrogen atoms bonded to a silicon atom in the molecule; (C2) a linear polyorganohydrogensiloxane having one hydrogen atom bonded to a silicon atom only at both terminals of the molecular chain, and having no aliphatic unsaturated bonds in the molecule; (D) a filler; (E) a platinum group metal compound; and (F) two or more kinds of specific adhesion imparting agent.

19 Claims, No Drawings

ADHESIVE POLYORGANOSILOXANE COMPOSITION

TECHNICAL FIELD

The present invention relates to an adhesive polyorganosiloxane composition that is cured by addition reaction.

BACKGROUND ART

Adhesive polyorganosiloxane compositions of addition reaction curing type are cured to exhibit adhesion with respect to various adherends. Compositions called silicone gels are known as polyorganosiloxane compositions that exhibit high fluidity in the uncured state and give soft cured products (Patent Literature 1). On the other hand, compositions that are highly filled with a filler for the purpose of reinforcement are known, with examples including silicone rubber compositions for molding (Patent Literature 2) and adhesive curable polyorganosiloxane compositions for sealing (Patent Literature 3).

CITATION LIST

Patent Literature

Patent Literature 1: Japanese Patent Application Kokai Publication No. H2-269771
Patent Literature 2: Japanese Patent Application Kokai Publication No. 2018-95796
Patent Literature 3: Japanese Patent Application Kokai Publication No. 2006-257355

DISCLOSURE OF INVENTION

Technical Problem

Silicone gels such as those disclosed in Patent Literature 1 usually do not contain fillers, and thus cured products thereof are easily torn. This brittleness of cured products is sometimes problematic. The compositions containing fillers such as those disclosed in Patent Literatures 2 and 3 give cured products that resist tearing. However, such cured products are hard and are not soft at all, and the compositions are disadvantageously highly viscous.

An object of the present invention is to provide an adhesive polyorganosiloxane composition which has excellent adhesion and a low viscosity and gives cured products of low elastic modulus and resistant to tearing.

Solution to Problem

The present invention pertains to the following [1] to [6].

[1] An adhesive polyorganosiloxane composition comprising:
(A) a linear polyorganosiloxane containing 2 or more $R^1$ in the molecule, wherein $R^1$ denotes an alkenyl group, and having a viscosity at 23° C. of 0.1 to 500 Pa·s, the linear polyorganosiloxane comprising a linear polyorganosiloxane containing 2 or more $R^1$ in the molecule, wherein $R^1$ denotes an alkenyl group, and having a viscosity at 23° C. of not less than 0.1 Pa·s and less than 1.0 Pa·s;
(B) a polyorganosiloxane including a $SiO_{4/2}$ unit and one or more kinds of units selected from the group consisting of $R_3SiO_{1/2}$ units and $R_2SiO_{2/2}$ units as an essential units, and including an $RSiO_{3/2}$ unit as an optional unit, wherein R is $R^1$ or $R^2$, $R^1$ is as described above, and $R^2$ denotes an unsubstituted or substituted, monovalent hydrocarbon group having no aliphatic unsaturated bonds, at least three groups R in the molecule being $R^1$;
(C) (C1) and (C2) described below:
(C1) a polyorganohydrogensiloxane having 3 or more hydrogen atoms bonded to a silicon atom in the molecule; and
(C2) a linear polyorganohydrogensiloxane having one hydrogen atom bonded to a silicon atom only at both terminals of the molecular chain, and having no aliphatic unsaturated bonds in the molecule;
(D) a filler;
(E) a platinum group metal compound; and
(F) at least two kinds of compounds selected from the group consisting of the following (F1) to (F4):
(F1) an organosilicon compound having a hydrogen atom bonded to a silicon atom, and a side chain of the following formula (I) bonded to a silicon atom:

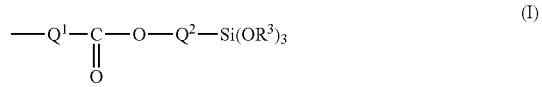

(F2) an organosilicon compound having a $Si(OR^3)_n$ group and an epoxy-containing group, and/or a partially hydrolyzed condensate thereof;
(F3) a silane compound having a $Si(OR^3)_n$ group and an aliphatic unsaturated hydrocarbon group, and/or a partially hydrolyzed condensate thereof; and
(F4) an organoaluminum compound;
wherein $Q^1$ denotes a linear or branched alkylene group forming a carbon chain having 2 or more carbon atoms between the silicon atom and the ester bond; $Q^2$ denotes a linear or branched alkylene group forming a carbon chain having 3 or more carbon atoms between the oxygen atom and the silicon atom in the side chain; $R^3$ denotes an alkyl group having 1 to 4 carbon atoms or a 2-methoxyethyl group; and n is an integer of 1 to 3; wherein
the ratio (H/Vi) of the total of the hydrogen atoms bonded to a silicon atom in (C) to the total of the groups $R^1$ in (A) and the groups $R^1$ in (B) is not less than 0.2 and less than 1.5,
the proportion of the hydrogen atoms bonded to a silicon atom in (C2) is 20 to 99 mol % of the hydrogen atoms bonded to a silicon atom in (C),
the content of the component (D) is not more than 20 wt % of the composition, and
the amount of the platinum group metal atoms in the component (E) is 0.1 to 1,000 ppm by weight relative to the total amount of the components (A) and (B).

[2] The adhesive polyorganosiloxane composition described in [1], wherein the component (C2) comprises a linear polyorganohydrogensiloxane represented by the general formula (IV):

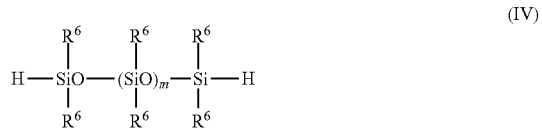

wherein, $R^6$ denotes an unsubstituted or substituted, monovalent hydrocarbon group having no aliphatic unsaturated bonds; and m is such a value that the viscosity at 23° C. is 0.001 to 10 Pa·s.

[3] The adhesive polyorganosiloxane composition described in [1] or [2], wherein the content of the linear polyorganosiloxane having a viscosity at 23° C. of not less than 0.1 Pa's and less than 1.0 Pa's is more than 10 parts by weight and not more than 90 parts by weight based on 100 parts by weight of the total of the component (A).

[4] The adhesive polyorganosiloxane composition described in any of [1] to [3], wherein the component (A) has a viscosity at 23° C. of 0.1 to 15 Pa·s.

[5] The adhesive polyorganosiloxane composition described in any of [1] to [4], wherein $R^1$ in the components (A) and (B) is a vinyl group.

[6] The adhesive polyorganosiloxane composition described in any of [1] to [5], wherein the component (E) comprises at least one selected from the group consisting of platinum-vinylsiloxane complexes and reaction products of chloroplatinic acid with an alcohol.

Advantageous Effects of Invention

The adhesive polyorganosiloxane compositions provided in the present invention have excellent adhesion and a low viscosity and give cured products of low elastic modulus and resistant to tearing.

BEST MODE FOR CARRYING OUT INVENTION

Definition of Terms

Structural units in siloxane compounds are sometimes abbreviated as follows (hereinafter, these structural units are sometimes written as "M units", "$D^H$ units" and so on).

M: $(CH_3)_3SiO_{1/2}$
$M^H$: $(CH_3)_2HSiO_{1/2}$
$M^V$: $(CH_3)_2(CH_2=CH)SiO_{1/2}$
D: $(CH_3)_2SiO_{2/2}$
$D^H$: $(CH_3)HSiO_{2/2}$
$D^V$: $(CH_3)(CH_2=CH)SiO_{2/2}$
T: $CH_3SiO_{3/2}$
Q: $SiO_{4/2}$ (tetrafunctional)

Specific examples of the groups in the present specification are as follows.

Examples of the monovalent hydrocarbon groups include alkyl groups, cycloalkyl groups, aryl groups, aralkyl groups and alkenyl groups. Examples of the monovalent hydrocarbon groups having no aliphatic unsaturated bonds include the monovalent hydrocarbon groups mentioned above except the alkenyl groups.

The alkenyl groups are linear or branched groups having 2 to 6 carbon atoms, with examples including vinyl group, allyl group, 3-butenyl group and 5-hexenyl group.

The alkyl groups are linear or branched groups having 1 to 18 carbon atoms, with examples including methyl group, ethyl group, propyl group, butyl group, pentyl group, hexyl group, octyl group, decyl group, dodecyl group, hexadecyl group and octadecyl group.

The cycloalkyl groups are monocyclic or polycyclic groups having 3 to 20 carbon atoms, with examples including cyclopentyl group and cyclohexyl group.

The aryl groups are aromatic groups having 6 to 20 carbon atoms which contain a monocyclic or polycyclic group, with examples including phenyl group and naphthyl group.

The aralkyl groups are alkyl groups substituted with an aryl group, with examples including 2-phenylethyl group and 2-phenylpropyl group.

The alkylene groups are linear or branched groups having 1 to 18 carbon atoms, with examples including methylene group, ethylene group, trimethylene group, 2-methylethylene group and tetramethylene group.

The alkenyl groups, the alkyl groups, the cycloalkyl groups, the aryl groups, the aralkyl groups and the alkylene groups may be substituted with substituents such as halogens including chlorine, fluorine and bromine; and cyano groups. Examples of such groups substituted with a halogen include chloromethyl group, chlorophenyl group, 2-cyanoethyl group and 3,3,3-trifluoropropyl group.

In the present specification, the "filler (D)" is also written as "(D)". The same applies to other components such as the "platinum group metal compound (E)".

In the present specification, the "specific surface area" is the specific surface area measured by the BET method.

In the present specification, the "viscosity" is a value measured in accordance with JIS K 6249 using a rotational viscometer at 23° C. while appropriately selecting the spindle number and the rotational speed.

Any component of the composition in the present specification may be a combination of a plurality of corresponding substances. In such cases, the content of such a component in the composition is the total amount of the plurality of substances present in the composition unless otherwise mentioned.

Adhesive Polyorganosiloxane Compositions

An adhesive polyorganosiloxane composition (hereinafter, also written simply as the "composition") comprises:

(A) a linear polyorganosiloxane containing 2 or more $R^1$ in the molecule wherein $R^1$ denotes an alkenyl group, and having a viscosity at 23° C. of 0.1 to 500 Pa·s, the linear polyorganosiloxane comprising a linear polyorganosiloxane containing 2 or more $R^1$ in the molecule, wherein $R^1$ denotes an alkenyl group, and having a viscosity at 23° C. of not less than 0.1 Pa·s and less than 1.0 Pa·s;

(B) a polyorganosiloxane including a S104/2 unit and one or more kinds of units selected from the group consisting of $R_3SiO_{1/2}$ units and $R_2SiO_{2/2}$ units as an essential units, and including an $RSiO_{3/2}$ unit as an optional unit, wherein, R is $R^1$ or $R^2$, $R^1$ is as described above, and $R^2$ denotes an unsubstituted or substituted, monovalent hydrocarbon group having no aliphatic unsaturated bonds, at least three groups R in the molecule being $R^1$;

(C) (C1) and (C2) described below:
 (C1) a polyorganohydrogensiloxane having 3 or more hydrogen atoms bonded to a silicon atom in the molecule; and
 (C2) a linear polyorganohydrogensiloxane having one hydrogen atom bonded to a silicon atom only at both terminals of the molecular chain, and having no aliphatic unsaturated bonds in the molecule;

(D) a filler;

(E) a platinum group metal compound; and (F) at least two kinds of compounds selected from the group consisting of the following (F1) to (F4):
 (F1) an organosilicon compound having a hydrogen atom bonded to a silicon atom, and a side chain of the following formula (I) bonded to a silicon atom:

$$-Q^1-\underset{\underset{O}{\|}}{C}-O-Q^2-Si(OR^3)_3 \quad (I)$$

(F2) an organosilicon compound having a Si(OR³)ₙ group and an epoxy-containing group, and/or a partially hydrolyzed condensate thereof;
(F3) a silane compound having a Si(OR³)ₙ group and an aliphatic unsaturated hydrocarbon group, and/or a partially hydrolyzed condensate thereof; and
(F4) an organoaluminum compound
wherein, $Q^1$ denotes a linear or branched alkylene group forming a carbon chain having 2 or more carbon atoms between the silicon atom and the ester bond; $Q^2$ denotes a linear or branched alkylene group forming a carbon chain having 3 or more carbon atoms between the oxygen atom and the silicon atom in the side chain; $R^3$ denotes an alkyl group having 1 to 4 carbon atoms or a 2-methoxyethyl group; and n is an integer of 1 to 3; wherein
the ratio (H/Vi) of the total of the hydrogen atoms bonded to a silicon atom in the component (C) to the total of the groups $R^1$ in the component (A) and the groups $R^1$ in the component (B) is not less than 0.2 and less than 1.5,
the proportion of the hydrogen atoms bonded to a silicon atom in the component (C2) is 20 to 99 mol % of the hydrogen atoms bonded to a silicon atom in the component (C),
the content of the component (D) is not more than 20 wt % of the composition, and
the amount of the platinum group metal atoms in the component (E) is 0.1 to 1,000 ppm by weight relative to the total amount of the components (A) and (B).

(A) Linear Polyorganosiloxanes

The component (A) is a linear polyorganosiloxane containing 2 or more $R^1$ in the molecule, wherein $R^1$ denotes an alkenyl group, and having a viscosity at 23° C. of 0.1 to 500 Pa·s. The linear polyorganosiloxane comprises a linear polyorganosiloxane containing 2 or more $R^1$ in the molecule, wherein $R^1$ denotes an alkenyl group, and having a viscosity at 23° C. of not less than 0.1 Pa·s and less than 1.0 Pa·s. The component (A) is a component that serves as a base polymer in the composition.

The "linear polyorganosiloxane containing 2 or more $R^1$ in the molecule, wherein $R^1$ denotes an alkenyl group, and having a viscosity at 23° C. of not less than 0.1 Pa·s and less than 1.0 Pa·s" is also written as the "low-viscosity linear polyorganosiloxane (A1)". The linear polyorganosiloxane (A) which contains 2 or more $R^1$ in the molecule, wherein $R^1$ denotes an alkenyl group, and has a viscosity at 23° C. of 0.1 to 500 Pa·s and which comprises the low-viscosity linear polyorganosiloxane (A1) is also written as the "linear polyorganosiloxane (A)".

The component (A) is not particularly limited as long as having a viscosity in the aforementioned range and being capable of forming a network structure by addition reaction with the Si—H bonds in the component (C). Typically, the component (A) comprises an alkenyl group-containing polyorganosiloxane which has in the molecule thereof at least two alkenyl group-containing siloxane units represented by the general formula (II):

$$(R^1)_a(R^2)_bSiO_{(4-a-b)/2} \quad (II)$$

wherein,
$R^1$ denotes an alkenyl group;
$R^2$ denotes an unsubstituted or substituted, monovalent hydrocarbon group having no aliphatic unsaturated bonds;
a is 1 or 2; and
b is an integer of 0 to 2, with the proviso that a+b is 2 or 3.

For the reasons that the synthesis is easy and deterioration is avoided in the fluidity of the composition before curing and in the heat resistance of cured products of the composition, $R^1$ is preferably a vinyl group. To take advantage of easy synthesis, a is preferably 1. For the reasons that the synthesis is easy and an excellent balance is attained in properties such as mechanical strength and fluidity of the composition in the uncured state, $R^2$ is preferably a methyl group. In other siloxane units in the component (A), such organic groups are bonded to silicon atoms as, for example, unsubstituted or substituted, monovalent hydrocarbon groups having no aliphatic unsaturated bonds. Such organic groups are preferably methyl groups for the same reasons as $R^2$.

For example, the component (A) includes a linear polyorganosiloxane (A') that is blocked with an $R_3SiO_{1/2}$ unit at both terminals and has an intermediate unit of an $R^2{}_2SiO_{2/2}$ units. Here, R is $R^1$ or $R^2$, and two or more of the groups R in the molecule are $R^1$. The $R_3SiO_{1/2}$ units in the component (A') are preferably $R^1R^2{}_2SiO_{1/2}$ units, $R^1{}_2R^2SiO_{1/2}$ units or $R^1{}_3SiO_{1/2}$ in units, and particularly preferably $R^1R^2{}_2SiO_{1/2}$ units. Examples of the $R^2{}_2SiO_{2/2}$ units in the component (A') include $R^1R^2SiO_{2/2}$ units and $R^2SiO_{2/2}$ units.

$R^1$ may be present at a terminal(s) or anywhere in the middle of the molecular chain of the component (A), and may be present at both of these positions. To ensure that excellent mechanical properties will be imparted to cured products of the composition, it is preferable that $R^1$ be present at least at both terminals of the molecular chain. That is, the component (A') preferably comprises a linear polyorganosiloxane that is blocked with an $R^1R^2{}_2SiO_{1/2}$ unit at both terminals and includes only an $R^2SiO_{2/2}$ unit as the intermediate unit, and particularly preferably comprises a linear polyorganosiloxane that is blocked with an $M^{vi}$ unit (a dimethylvinylsiloxane unit) at both terminals and includes only a D unit (a dimethylsiloxane unit) as the intermediate unit.

The component (A) may be one kind of a linear polyorganosiloxane or may be a combination of two or more kinds of linear polyorganosiloxanes.

<<Viscosity of Component (A)>>

The viscosity of the component (A) is 0.1 to 500 Pa·s at 23° C. By virtue of the component (A) having a viscosity in the range of 0.1 to 500 Pa·s, the composition in the uncured state exhibits good fluidity to offer excellent workability in a casting or potting process and gives cured products having excellent mechanical strength and appropriate elasticity and hardness. The viscosity of the component (A) is preferably 0.1 to 300 Pa·s, more preferably 0.1 to 20 Pa·s, still more preferably 0.1 to 15 Pa·s, further preferably 0.2 to 15 Pa·s, and particularly preferably 0.3 to 15 Pa·s.

The viscosity of the low-viscosity linear polyorganosiloxane (A1) is not less than 0.1 Pa·s and less than 1.0 Pa·s at 23° C. The component (A1) is a component essentially present in the component (A). The addition of the low-viscosity linear polyorganosiloxane (A1) efficiently lowers the viscosity of the composition that is obtained. The viscosity of the low-viscosity linear polyorganosiloxane (A1) is preferably not less than 0.1 Pa·s and not more than 0.5 Pa·s at 23° C.

In the case where the composition includes a plurality of linear polyorganosiloxanes containing 2 or more $R^1$ in the molecule, wherein $R^1$ denotes an alkenyl group, the viscosity of the component (A) means the viscosity of the total of such substances. When, for example, the component (A) is a combination of two or more kinds of linear polyorganosiloxanes containing 2 or more $R^1$ in the molecule, wherein $R^1$ denotes an alkenyl group, the viscosity of the component (A) means the viscosity of the mixture of such linear polyorganosiloxanes. Thus, when the viscosity of the component (A) is not less than 0.1 Pa·s and less than 1.0 Pa·s at 23° C., the component (A) may consist of the component (A1). In other cases, the component (A) may consist of a linear polyorganosiloxane which contains 2 or more $R^1$ in the molecule, wherein $R^1$ denotes an alkenyl group, and has a viscosity at 23° C. of not less than 0.1 Pa·s and not more than 500 Pa·s.

The viscosity of any component, other than the component (A1), included in the component (A) is not limited as long as the viscosity of the component (A) is 0.1 to 500 Pa·s at 23° C. Such an additional component is preferably a linear polyorganosiloxane (A2) which contains 2 or more $R^1$ in the molecule (wherein $R^1$ denotes an alkenyl group) and has a viscosity at 23° C. of not less than 1.0 Pa·s, particularly preferably not less than 1.0 Pa·s and not more than 500 Pa·s. Examples of the component (A2) include a linear polyorganosiloxane (A2-1) containing 2 or more $R^1$ in the molecule, wherein $R^1$ denotes an alkenyl group, and having a viscosity at 23° C. of not less than 1.0 Pa·s and less than 10.0 Pa·s, and a linear polyorganosiloxane (A2-2) containing 2 or more $R^1$ in the molecule, wherein $R^1$ denotes an alkenyl group, and having a viscosity at 23° C. of not less than 10 Pa·s and not more than 500 Pa·s. Here, when the viscosity of the low-viscosity linear polyorganosiloxane (A1) at 23° C. is not less than 0.1 Pa·s and less than 0.5 Pa·s falling in the preferred range of the viscosity thereof, the lower limit of the viscosity of the component (A2) may be not less than 0.5 Pa·s.

Particularly preferably, the component (A) comprises the component (A1), the component (A2-1) and the component (A2-2). It is preferable that the component (A) do not have an alkoxy group bonded to a silicon atom.

<(B) Branched Polyorganosiloxanes>

The component (B) is a polyorganosiloxane including a $SiO_{4/2}$ unit and one or more kinds of units selected from the group consisting of $R_3SiO_{1/2}$ units and $R_2SiO_{2/2}$ units as an essential units, and including an $RSiO_{3/2}$ unit as an optional unit, wherein R is $R^1$ or $R^2$, $R^1$ is as described hereinabove, and $R^2$ denotes an unsubstituted or substituted, monovalent hydrocarbon group having no aliphatic unsaturated bonds, at least three groups R in the molecule being $R^1$ (this polyorganosiloxane is also written as the "branched polyorganosiloxane (B)"). The component (B) is a component that serves as a base polymer in the composition, and imparts excellent mechanical strength to cured products of the composition and makes them resistant to tearing. To ensure that the groups R in the component (B) will serve as crosslinking sites in the curing reaction, at least three groups R in the molecule are $R^1$ and the rest are $R^2$.

$R^1$ may be present as R in the $R_3SiO_{1/2}$ unit or may be present as R in the $R_2SiO_{2/2}$ unit. For the reason that curability is easily controlled, it is preferable that $R^1$ is present in the $R_3SiO_{1/2}$ unit. That is, part or all of the $R_3SiO_{1/2}$ units present in the component (B) are preferably $R^1R^2_2SiO_{1/2}$ units.

Examples of the combinations of units present in the component (B) include a combination (B1) of $SiO_{4/2}$ unit, $R^1R^2_2SiO_{1/2}$ unit and $R^2_2SiO_{2/2}$ unit, and a combination (B2) of $SiO_{4/2}$ unit, $R^2_3SiO_{1/2}$ unit and $R^1R^2SiO_{2/2}$ unit. The structure of the component (B2) is preferable for the reason that easy control of curability and strength are easily satisfied in a well balanced manner.

For the reason that the composition gives cured products having excellent mechanical strength, the polyorganosiloxane is preferably one which is in the form of a solid resin or a viscous semisolid resin at room temperature and has a molar ratio of the $R_3SiO_{1/2}$ unit to the $SiO_{4/2}$ unit in the range of 1:0.8 to 1:3.

The component (B) may be one kind of a polyorganosiloxane or may be a combination of two or more kinds of polyorganosiloxanes. It is preferable that the component (B) do not have an alkoxy group bonded to a silicon atom.

<<(C) Polyorganohydrogensiloxanes>

The component (C) is a combination of components (C1) and (C2). Here, the component (C1) is a polyorganohydrogensiloxane having 3 or more hydrogen atoms bonded to a silicon atom in the molecule, and the component (C2) is a linear polyorganohydrogensiloxane having one hydrogen atom bonded to a silicon atom only at both terminals of the molecular chain, and having no aliphatic unsaturated bonds in the molecule. The component (C) functions as a crosslinking agent for the components (A) and (B) as a result of the hydrosilyl groups (Si—H) contained in the molecule undergoing addition reaction with the groups $R^1$ in the components (A) and (B).

<<(C1)>>

The component (C1) is a component that has at least 3 hydrogen atoms bonded to a silicon atom which are involved in the addition reaction, and thereby contributes to allowing the composition to be cured into a network structure. The number of the hydrogen atoms bonded to a silicon atom in the component (C1) is preferably 3 to 100, and particularly preferably 5 to 50 per molecule of the component (C1). When the number of such hydrogen atoms is in this range, the composition can give cured products having excellent mechanical strength and a lower elastic modulus.

The component (C1) typically has in the molecule 3 or more units represented by the general formula (III):

$$(R^5)_cH_dSiO_{(4-c-d)/2} \tag{III}$$

wherein,
  $R^5$ denotes an unsubstituted or substituted, monovalent hydrocarbon group having no aliphatic unsaturated bonds;
  c is an integer of 0 to 2; and
  d is 1 or 2, with the proviso that c+d is an integer of 1 to 3.

For the reason of easy synthesis, $R^5$ is preferably a methyl group. Further, d is preferably 1 to facilitate the synthesis. To facilitate the synthesis, the component (C1) preferably includes 3 or more siloxane units. To ensure that the polyorganohydrogensiloxane will not volatilize even when heated to a curing temperature, that the composition in the uncured state will exhibit high fluidity, and that the polyorganohydrogensiloxane will be easily mixed with the components (A) and (B), the number of the siloxane units in the component (C1) is preferably 6 to 200, and particularly preferably 10 to 150. The siloxane skeleton in the component (C1) may be linear, branched or cyclic.

The component (C1) preferably is a linear polyorganohydrogensiloxane (C1-1) that is blocked with an $R^7_3SiO_{1/2}$ unit independently at both terminals and includes only an $R^7_2SiO_{2/2}$ unit as the intermediate unit independently at each occurrence, or a polyorganohydrogensiloxane (C1-2) consisting solely of an $R^7_3SiO_{1/2}$ unit and a $SiO_{4/2}$ unit wherein, $R^7$ independently at each occurrence denotes a hydrogen atom or $R^5$, with the proviso that at least three of $R^7$ are hydrogen atoms. In the cases of the components (C1-1) and (C1-2), examples of the $R^7_3SiO_{1/2}$ units include $HR^5_2SiO_{1/2}$ units and $R^5_3SiO_{1/2}$ units, and examples of the $R^7_2SiO_{2/2}$ units include $HR^5SiO_{2/2}$ units and $R^5_2SiO_{2/2}$ units. In the case of the component (C1-1), the hydrogen atoms bonded to a silicon atom may be present at the terminals or in the intermediate units but are preferably present in the intermediate units.

Particularly preferably, the component (C1) is a linear polymethylhydrogensiloxane (C1-1') that is blocked with an M unit (a trimethylsiloxane unit) at both terminals and includes only a D unit (a dimethylsiloxane unit) and a $D^H$ unit (a methylhydrogensiloxane unit) as the intermediate units, wherein methylhydrogensiloxane units in 0.1 to 2.0 mol per mol of the dimethylsiloxane units, or a polymethylhydrogensiloxane (C1-2') consisting of an $M^H$ unit (a dimethylhydrogensiloxane unit) and a Q unit (a $SiO_{2/2}$ unit).

The component (C1) may be one kind of a polyorganohydrogensiloxane or may be a combination of two or more kinds of polyorganohydrogensiloxanes. It is preferable that the component (C1) do not have an alkoxy group bonded to a silicon atom.

<<(C2)>>

The component (C2) is a component which has one hydrogen atom bonded to a silicon atom only at both terminals of the molecular chain, and thereby imparts good stretchability to cured products of the composition. The component (C2) may typically include a linear polyorganohydrogensiloxane represented by the general formula (IV):

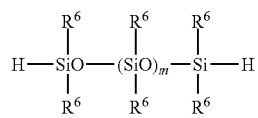

(IV)

wherein, $R^6$ denotes an unsubstituted or substituted, monovalent hydrocarbon group having no aliphatic unsaturated bonds; and m is such a value that the viscosity at 23° C. is 0.001 to 10 Pa·s.

To facilitate the synthesis, $R^6$ is most preferably a methyl group. The groups $R^6$ may be the same as or different from one another, but are preferably the same as one another to facilitate the synthesis. Specific examples include α,ω-dimethylsilyl-terminated polyorganosiloxanes such as α,ω-dimethylsilyl-terminated polydimethylsiloxane.

The component (C2) may be one kind of a linear polyorganohydrogensiloxane or may be a combination of two or more kinds of linear polyorganohydrogensiloxanes. It is preferable that the component (C2) do not have an alkoxy group bonded to a silicon atom.

<(D) Fillers>

The filler (D) is a component that imparts appropriate fluidity to the composition in the uncured state and imparts to cured products high mechanical strength required depending on use applications. Inorganic fillers are preferable. Examples of the inorganic fillers include reinforcing fillers such as fumed silica, pyrogenic silica, silica aerogel, precipitated silica and fumed titanium oxide, and hydrophobized fillers obtained by hydrophobizing the surface of the above fillers with agents such as polyorganosiloxanes and hexamethyldisilazane; and non-reinforcing fillers such as diatomaceous earth, ground silica, aluminum oxide, zinc oxide, aluminosilicic acid, calcium carbonate, organic acid surface-treated calcium carbonate, magnesium carbonate, zinc carbonate, calcium silicate, talc and ferric oxide. The inorganic fillers are selected in accordance with extrusion workability, and properties required of cured products. Depending on purposes, the inorganic fillers may be replaced by or combined with conductive fillers such as carbon blacks. To concurrently satisfy high fluidity and reinforcement, fumed silica is most preferable. The specific surface area of the fumed silica is not particularly limited but is preferably 50 to 500 $m^2/g$, and particularly preferably 100 to 400 $m^2/g$.

<(E) Platinum Group Metal Compounds>

The platinum group metal compound (E) is a catalyst which promotes the addition reaction between the alkenyl groups in the components (A) and (B) and the hydrosilyl groups in the component (C), and allows a component (F1) and/or a component (F3) described later to be introduced into the siloxane network structure of the crosslinked polymer through the similar addition reaction.

Examples of the component (E) include platinum compounds such as chloroplatinic acid, reaction products of chloroplatinic acid with an alcohol (for example, Lamoreaux catalyst (platinum-octanol complex, U.S. Pat. No. 3,220,972)), platinum-olefin complexes, platinum-vinylsiloxane complexes, platinum-ketone complexes and platinum-phosphine complexes. Among these, reaction products of chloroplatinic acid with an alcohol, and platinum-vinylsiloxane complexes will be preferable due to good catalytic activity, but preferred catalysts are not limited thereto.

The component (E) may be one kind of a platinum group metal compound or may be a combination of two or more kinds of platinum group metal compounds.

<(F) Adhesion Imparting Agents>

The adhesion imparting agent (F) is at least two kinds of adhesion imparting agents selected from the group consisting of the following components (F1) to (F4):

(F1) an organosilicon compound having a hydrogen atom bonded to a silicon atom, and a side chain of the following formula (I) bonded to a silicon atom:

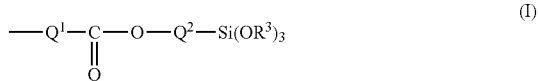

(I)

(F2) an organosilicon compound having a $Si(OR^3)_n$ group and an epoxy-containing group, and/or a partially hydrolyzed condensate thereof;

(F3) a silane compound having a $Si(OR^3)_n$ group and an aliphatic unsaturated hydrocarbon group, and/or a partially hydrolyzed condensate thereof; and (F4) an organoaluminum compound wherein, $Q^1$, $Q^2$, $R^3$ and n are as described hereinabove.

The component (F) is a component that imparts adhesion with respect to various substrates to the composition. Each of the component (F1), the component (F2), the component (F3) and the component (F4) may be one kind of a compound or may be a combination of two or more kinds of compounds. For example, the component (F) may be a combination of one kind of the component (F1), two kinds of the components (F2) and two kinds of the components (F3).

<<(F1)>>

The component (F1) is a component that is introduced into the crosslinked siloxane structure by addition reaction with the components (A) and (B) during the addition reaction for the curing of the composition, and has a side chain of the formula (I) which is responsible for adhesion, thus contributing to the adhesion of the composition. Further, the alkoxy groups present in the side chain of the component (F1) (hereinafter, the alkoxy group may be a 2-methoxyethoxy group) undergo co-hydrolysis/condensation reaction with the alkoxy groups of the component (F2) and/or the component (F3) and thereby contribute to introducing the component (F2) and/or the component (F3) into the siloxane skeleton.

For the reason of easy synthesis and handling, $Q^1$ is preferably an ethylene group or a 2-methylethylene group. $Q^2$ is preferably a trimethylene group to facilitate the synthesis and handling. For the reasons that good adhesion is imparted and the alcohol resulting from the hydrolysis is easily volatilized, $R^3$ is preferably a methyl group or an ethyl group, and particularly preferably a methyl group.

To facilitate the synthesis, the hydrogen atom and the side chain described above which are the characteristics of the component (F1) are preferably bonded to different silicon atoms. Thus, the basic portion of the component (F1) preferably forms a linear, branched or cyclic siloxane skeleton, and is particularly preferably a cyclic siloxane skeleton for the reason that the specific compound can be synthesized and purified in a well controlled manner. There may be 1 or more Si—H bonds in the component (F1), and in the case of a cyclic siloxane compound, the number thereof is preferably 2 or 3.

Examples of the component (F1) include the following compounds.

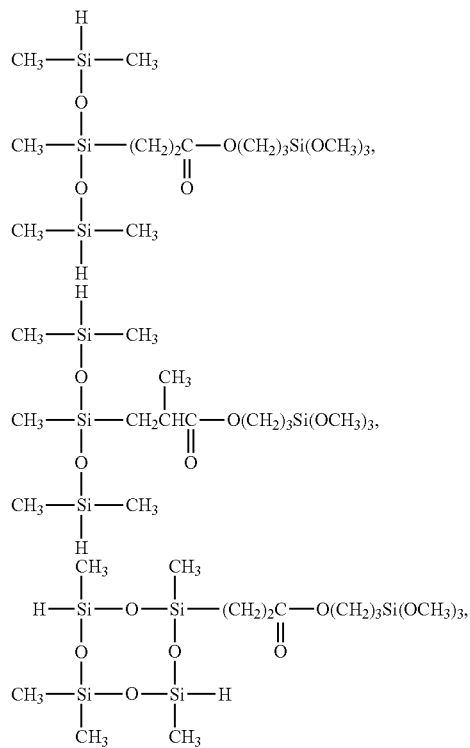

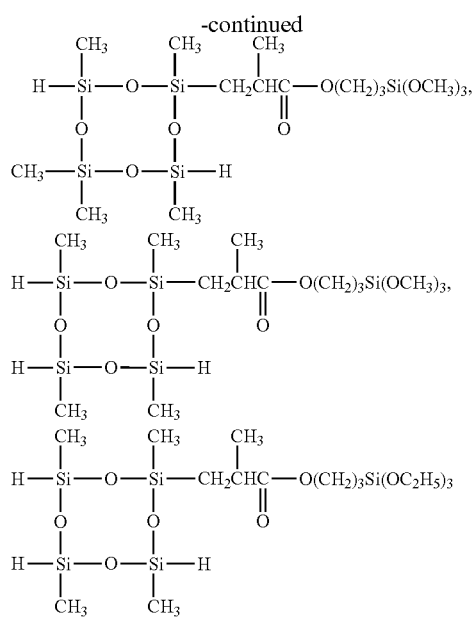

<<(F2)>>

The component (F2) is a component that has an alkoxy group bonded to a silicon atom (hereinafter, $OR^3$ may be a 2-methoxyethoxy group) and is introduced into the crosslinked siloxane structure by the hydrolysis/condensation reaction between the alkoxy group thereof and the alkoxy group bonded to a silicon atom in the component (F1), the component (F3) and/or the component (F4). The component (F2) also has an epoxy group responsible for adhesion and thus contributes to enhancing the adhesion, particularly with respect to plastics, of the composition.

To ensure that good adhesion will be imparted, $R^3$ is preferably a methyl group or an ethyl group, and particularly preferably a methyl group. The letter n is preferably 2 or 3. To facilitate the synthesis and to ensure that the group will not be hydrolyzed and will exhibit good adhesion, the epoxy-containing group is preferably, for example, an aliphatic epoxy-containing group having an ether oxygen atom, such as a 3-glycidoxypropyl group; or an alicyclic epoxy-containing group such as a 2-(3,4-epoxycyclohexyl) ethyl group. The number of the alkoxy groups bonded to a silicon atom is preferably 2 or more in the molecule. The group $OR^3$ and the epoxy-containing group may be bonded to the same silicon atom or may be bonded to different silicon atoms.

Examples of the component (F2) include 3-glycidoxypropyl group-containing alkoxysilanes such as 3-glycidoxypropyltrimethoxysilane, 3-glycidoxypropyltriethoxysilane and 3-glycidoxypropyl(methyl)dimethoxysilane; 2-(3,4-epoxycyclohexyl)ethyl group-containing alkoxysilanes such as 2-(3,4-epoxycyclohexyl)ethyltrimethoxysilane, 2-(3,4-epoxycyclohexyl)ethyltriethoxysilane and 2-(3,4-epoxycyclohexyl)ethyl(methyl)dimethoxysilane; partially hydrolyzed condensates of the above silanes in which n is 2 or greater; and carbon/silicon bifunctional siloxanes obtained from linear or cyclic methylsiloxanes by the substitution of part of the methyl groups with a trimethoxysiloxy group or a 2-(trimethoxysilyl)ethyl group and with the epoxy-containing group described hereinabove.

<<(F3)>>

The component (F3) is a component that is introduced into the crosslinked siloxane structure by the hydrolysis/ condensation reaction between the alkoxy group bonded to a silicon atom in the component (F3) and the alkoxy group bonded to a silicon atom in the component (F1), the component (F2) and/or the component (F4) or is introduced into the crosslinked siloxane structure by addition reaction of an aliphatic unsaturated hydrocarbon group in the component (F3) with the component (C) during the addition reaction for the curing of the composition. Further, the alkoxy group bonded to a silicon atom in the component (F3) undergoes co-hydrolysis/condensation reaction with the alkoxy group of other component (F3) and, when used in combination with the component (F2), the alkoxy group in the component (F2) to introduce other component (F3) and/or the component (F2) into the siloxane structure. The remaining alkoxy groups are responsible for adhesion and contribute to enhancing the adhesion, particularly with respect to metals, of the composition.

To ensure that good adhesion will be imparted, $R^3$ is preferably a methyl group or an ethyl group, and particularly preferably a methyl group. The letter n is preferably 2 or 3. The aliphatic unsaturated hydrocarbon group may be bonded directly to a silicon atom in the case of an alkenyl group such as vinyl, allyl or 3-butenyl, or may be such that an unsaturated acyloxy group is bonded to a silicon atom via 3 or more carbon atoms as in the case of 3-acryloxypropyl or 3-methacryloxypropyl. To facilitate the synthesis and handling, for example, the unsaturated hydrocarbon group-containing group is preferably a vinyl group or a methacryloxypropyl group.

Examples of the component (F3) include alkenylalkoxysilanes such as vinyltrimethoxysilane, vinyltriethoxysilane, vinyltris(2-methoxyethoxy)silane, methylvinyldimethoxysilane, allyltrimethoxysilane, allyltriethoxysilane and methylallyldimethoxysilane and/or partial hydrolyzates thereof; and (meth)acryloxypropyl(methyl)di- and (meth)acryloxypropyltri-alkoxysilanes such as 3-acryloxypropyltrimethoxysilane, 3-acryloxypropyltriethoxysilane, 3-acryloxypropyl(methyl)dimethoxysilane, 3-methacryloxypropyltrimethoxysilane, 3-methacryloxypropyltriethoxysilane and 3-methacryloxypropyl(methyl)dimethoxysilane and/or partial hydrolyzates thereof.

<<(F4)>>

The component (F4) is an organoaluminum compound. Examples of the component (F4) include aluminum alcoholates such as $(MeO)_3Al$, $(EtO)_3Al$ and $(n-PrO)_3Al$; aluminum salts such as those of naphthenic acid, stearic acid, octylic acid and benzoic acid; aluminum chelates such as products of reaction between aluminum alcoholates and acetoacetic acid esters, dialkyl malonates or the like; organic acid salts of aluminum oxide; and aluminum acetylacetonate. The component (F4) is preferably an aluminum chelate or an aluminum alcoholate because of excellent hydrolyzability, or preferably comprises bisethylacetoacetate aluminum monoacetylacetonate or aluminum alkylacetoacetate diisopropylate because of easy handling in a liquid state.

Preferred Embodiments

The component (F) preferably comprises the component (F2). That is, the component (F) preferably is a combination of the component (F2) and one or more kinds selected from the group consisting of the component (F1), the component (F3) and the component (F4). Particularly preferably, the component (F) is a combination of the component (F1) and the component (F2), a combination of the component (F1), the component (F2) and the component (F3), or a combination of the component (F2) and the component (F4).

<(G) Additional Components>

The composition may include an additional component (G) while still ensuring that the advantageous effects of the present invention are not impaired. Examples of such components include an additional adhesion imparting agent (G1) (except the adhesion imparting agents (F)), a reaction control agent (G2) and an additive (G3). Each of these additional components (G) may be one kind of a component or may be a combination of two or more kinds of components.

<<(G1) Additional Adhesion Imparting Agents (Except Adhesion Imparting Agents (F))>>

Examples of the component (G1) include (G1-1) a tetraalkoxysilane compound represented by $Si(OR^4)_4$ and/or a partial hydrolyzate thereof, and (G1-2) a metal alkoxide (except aluminum alkoxides).

The component (G1-1) is a component that further enhances the adhesion of the composition with respect to metals. $R^4$ denotes an alkyl group having 1 to 3 carbon atoms, and is preferably a methyl group or an ethyl group because such a compound is easily available, is easy to handle, and offers marked effects in the enhancement of adhesion. Further, the component (G1-1) preferably comprises a partial hydrolyzate of the tetraalkoxysilane compound because of its excellent hydrolyzability and low toxicity.

The component (G1-2) is a component that further enhances the adhesion of the composition. Examples of the component (G1-2) include metal alkoxides (except aluminum alkoxides) such as titanium alkoxides including titanium tetraethoxide, titanium tetrapropoxide, titanium tetraisopropoxide, titanium tetrabutoxide, titanium tetraisobutoxide and titanium tetraisopropenyl oxide; and zirconium alkoxides including zirconium tetraisopropoxide and zirconium tetrabutoxide.

<<(G2) Reaction Control Agents>>

Examples of the reaction control agent (G2) include organic compounds having a polar group in the molecule such as diallyl maleate; and organic compounds having an unsaturated bond such as acetylene alcohols and derivatives thereof. The reaction control agent (G2) is a component that retards the curing reaction rate of the composition and contributes to enhancing the handling workability and the balance between the development of adhesion and the curing rate.

<<(G3) Various Additives>>

Depending on purposes, the composition may further include any of various additives (G3) such as organic solvents, pigments, thixotropic agents, viscosity modifiers for improving extrusion workability, UV inhibitors, fungicides, heat resistance improvers and flame retardants. Each of the various additives (G3) may be one kind of an additive or may be a combination of two or more kinds of additives. Depending on use applications, the composition may be dissolved or dispersed in an organic solvent such as toluene or xylene.

[Contents of Components]

The contents of the components in the composition are as follows.

The content of the component (A) is preferably 10 to 5,000 parts by weight, more preferably 50 to 4,000 parts by weight, and particularly preferably 100 to 3,000 parts by weight with respect to 100 parts by weight of the total of the component (B), the component (C), the component (D), the component (E) and the component (F). This range of the content ensures that adhesion will be efficiently enhanced.

The content of the low-viscosity linear polyorganosiloxane (A1) is preferably more than 10 parts by weight and not more than 99 parts by weight, more preferably more than 10 parts by weight and not more than 90 parts by weight, and particularly preferably not less than 20 parts by weight and not more than 90 parts by weight with respect to 100 parts by weight of the total of the component (A). Further, the content of the linear polyorganosiloxane (A2-1) having a viscosity at 23° C. of not less than 1.0 Pa·s and less than 10.0 Pa·s is preferably 1 part by weight to 60 parts by weight, and particularly preferably not less than 10 parts by weight and not more than 80 parts by weight with respect to 100 parts by weight of the total of the component (A). When the contents of the component (A1) and the component (A2-1) are in the above ranges, the viscosity of the composition is efficiently lowered. Further, an excessive increase in cross-linking density is avoided, and cured products exhibit a lower elastic modulus.

The content of the branched polyorganosiloxane (B) containing an alkenyl group is preferably 1 to 100 parts by weight, more preferably 0.5 to 80 parts by weight, still more preferably 1 to 60 parts by weight, and particularly preferably 5 to 50 parts by weight with respect to 100 parts by weight of the linear polyorganosiloxane (A) containing an alkenyl group. When the content of the component (B) is 100 parts by weight or less, an excessive increase in cross-linking density is avoided, and cured products exhibit a lower elastic modulus. Further, the above range of the content of the component (B) ensures that cured products are enhanced in mechanical strength and can resist tearing.

The content of the component (C) is preferably such that the ratio (H/Vi) of the total H of the hydrogen atoms bonded to a silicon atom in (C) to the total Vi of the alkenyl groups in the components (A) and (B) is not less than 0.2 and less than 1.5, more preferably 0.9 to 1.4, and particularly preferably more than 1.0 and not more than 1.3. The content may be such that the H/Vi is more than 1.2 and less than 1.5. When the H/Vi in the composition is 0.2 or above, cured products attain excellent mechanical strength. When the ratio is less than 1.5, rubber cured products that are obtained have a good balance between adhesion and elastic modulus.

In the component (C), the proportion of the hydrogen atoms bonded to a silicon atom in the component (C2) is 20 to 99 mol % of the hydrogen atoms bonded to a silicon atom in the component (C). By virtue of the proportion being in this range, the elastic modulus of cured products is lowered. The proportion of the hydrogen atoms bonded to a silicon atom in the component (C2) is preferably 30 to 95 mol %, and particularly preferably 40 to 90 mol %. Here, the proportion of the hydrogen atoms bonded to a silicon atom in the component (C2) relative to the hydrogen atoms bonded to a silicon atom in the component (C) is sometimes represented by "$H_{C2}/(H_{C1}+H_{C2})$". Here, $H_{C1}$ is the number of the hydrogen atoms bonded to a silicon atom in the component (C1), and $H_{C2}$ is the number of the hydrogen atoms bonded to a silicon atom in the component (C2).

The content of the component (D) is more than 0 wt % and not more than 20 wt % of the composition. If the content of the component (D) exceeds 20 wt % of the composition, the viscosity of the composition is excessively increased. The content of the component (D) is preferably not less than 0.5 wt % and not more than 10 wt %, and particularly preferably not less than 1 wt % and not more than 5 wt % of the composition. When the content of the component (D) is in the above range, the composition in the uncured state has high fluidity and offers excellent discharge workability, and cured products that are obtained attain excellent mechanical strength.

The content of the component (E) is preferably 0.1 to 1,000 ppm by weight, and particularly preferably 0.5 to 200 ppm by weight in terms of platinum metal atom relative to the total amount of the components (A) and (B). When the content of the component (C) is in the above range, the balance between curability and the development of adhesion is easily controlled.

When the composition includes the component (F1), the component (F2) and/or the component (F3), the total amount of the component (F1), the component (F2) and/or the component (F3) is preferably 0.1 to 20 parts by weight, and particularly preferably 0.5 to 10 parts by weight with respect to 100 parts by weight of the component (A). This quantitative range ensures that the composition will give cured products which have sufficient adhesion that is required and can concurrently satisfy desired mechanical strength and elastic modulus. When the composition includes the component (F4), the content of the component (F4) is preferably 0.01 to 10 parts by weight, and particularly preferably 0.1 to 5 parts by weight with respect to 100 parts by weight of the component (A) to ensure that excellent adhesion to metals at room temperature will be imparted to silicone rubbers obtained by curing. To obtain good adhesion, it is preferable that the weight ratio of one of the components (F1) to (F4) be 0.05 to 20 times that of another component (F). When the component (F) comprises a mixture of three or four kinds of components selected from the group consisting of the components (F1) to (F4), it is preferable that each component represent not less than 5 wt % of the component (F).

The content of the component (G) is not particularly limited as long as the composition can be used for the intended purpose.

(Methods for Producing Compositions)

The composition may be produced by uniformly kneading the essential components (A) to (F) and optionally the additional component (G) with a mixing device such as a universal kneading machine or a kneader. For stable long-term storage, the components may be appropriately stored in two containers so that the component (E) is contained in a different container from the components (C) and (F1), and the components may be mixed together and defoamed under reduced pressure immediately before use.

The composition may be applied to an adherend by, for example, being poured, dropped, flowed, cast or extruded from a container to a bonding site, or by being monolithically transfer molded or injection molded with the adherend, and may be cured into a silicone rubber while being concurrently bonded to the adherend. By virtue of excellent flexibility of silicone rubbers, the composition can give a silicone rubber with excellent adhesion and low elastic modulus while being prevented from cracks even when cured at a higher temperature. The heating temperature for curing may be, for example, up to 200° C. The composition may be cured by heating at a relatively low temperature in a relatively short time, specifically, at 80° C. in 1 hour, or at 100° C. in 30 minutes. Enhanced productivity can be thus expected.

Uses

The composition may be used to mount or encapsulate semiconductor devices, or to bond semiconductors or general-purpose plastics. The composition is also useful as a sealant or a potting agent for optical elements and semiconductor modules.

EXAMPLES

Hereinbelow, the present invention will be described in greater detail based on Examples and Comparative Examples. In these examples, parts indicate parts by weight and the viscosity is a viscosity at 23° C. The scope of the present invention is not limited by these examples.

(Components Used)

The components used in Examples and Comparative Examples are as follows.

(A) Linear Polyorganosiloxanes

A-1: Linear polymethylvinylsiloxane blocked with $M^V$ unit at both terminals, including only D unit as intermediate unit, and having a viscosity at 23° C. of 100 Pa·s.

A-2: Linear polymethylvinylsiloxane blocked with $M^V$ unit at both terminals, including only D unit as intermediate unit, and having a viscosity at 23° C. of 10 Pa·s.

A-3: Linear polymethylvinylsiloxane blocked with $M^V$ unit at both terminals, including only D unit as intermediate unit, and having a viscosity at 23° C. of 3.0 Pa·s.

A-4: Linear polymethylvinylsiloxane blocked with unit at both terminals, including only D unit as intermediate unit, and having a viscosity at 23° C. of 0.3 Pa·s.

(B) Branched Polyorganosiloxanes

B-1: Resinous polymethylvinylsiloxane including M unit, $M^V$ unit and Q unit in a molar ratio of $M:M^V:Q=6:1:8$ and having Mw (weight average molecular weight) of 3,000.

B-2: Resinous polymethylvinylsiloxane including M unit, $M^V$ unit and Q unit in a molar ratio of $M:M^V:Q=5:1:8$ and having Mw (weight average molecular weight) of 3,000.

(C) Polyorganohydrogensiloxanes

C-1-1: Linear polymethylhydrogensiloxane blocked with M unit at both terminals, having 50 mol % of $D^H$ unit and the balance of D unit, and having a viscosity at 23° C. of 0.02 Pa·s (average number of hydrogen atoms per molecule: 20).

C-1-2: Polymethylhydrogensiloxane including $M^H$ and Q units, and having a viscosity at 23° C. of 0.017 Pa·s (content of hydrogen atoms bonded to silicon: 1.0 wt %).

C-2: Linear polymethylhydrogensiloxane blocked with $M^H$ unit at both terminals, including D unit as intermediate unit, and having a viscosity at 23° C. of 0.015 Pa·s.

(D) Fillers

D-1: Silica obtained by surface-treating fumed silica with hexamethyldisilazane and having a BET specific surface area of 200 m²/g.

D-2: Carbon black.

(E) Platinum Group Metal Compounds

E-1: Complex obtained by heating chloroplatinic acid with octanol and having a platinum content of 4 wt %.

E-2: Platinum-vinylsiloxane complex obtained by heating chloroplatinic acid with siloxane dimer represented by WM″, and having a platinum content of 2 wt %.

(F) Adhesion Imparting Agents

F-1: Mixture of cyclic siloxane isomers represented by the formulae:

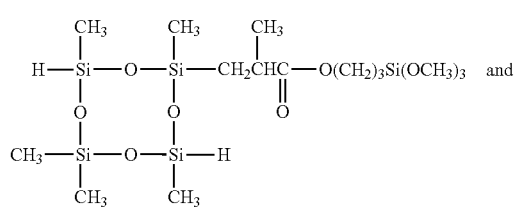

and

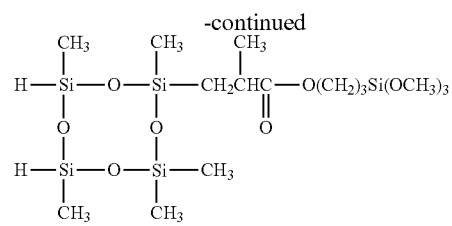

F-2: 3-Glycidoxypropyltrimethoxysilane.

F-3: Vinyltriethoxysilane.

F-4: Aluminum alkylacetoacetate diisopropylate (Aluminum Chelate M manufactured by Kawaken Fine Chemicals Co., Ltd.).

(G) Additional Component

G-1: Diallyl Maleate

Example 1

A container equipped with a stirrer, a heating device and a depressurizing device was loaded with A-3 and a 50 wt % B-1 toluene solution prepared beforehand. The mixture was mixed to uniformity. Thereafter, toluene was distilled away at 150° C. and 0.13 kPa. A polysiloxane solution was thus prepared. The solution was transferred to a universal kneading machine, and D-1 and A-4 were added. The mixture was kneaded under reduced pressure at 150° C. for 3 hours. A-1 was further added, and the resultant mixture was kneaded under reduced pressure for 1 hour. The kneaded product was cooled to not more than 40° C., and E-1 was mixed and dispersed therein. Thereafter, G-1 was mixed. Next, C-1-1, C-2, F-1 and F-2 were added, and the mixture was rapidly kneaded under reduced pressure for 30 minutes and was thereby defoamed. A polyorganosiloxane composition was thus prepared.

Examples 2 and 3, and Comparative Examples 1 to 7

Polyorganosiloxane compositions were prepared in accordance with the procedures in Example 1. The formulations in Examples and Comparative Examples are described in Table 1.

(Evaluation Methods)

<Viscosity>

The viscosity was measured in accordance with JIS K 6249 with a rotational viscometer at room temperature (23° C.) while appropriately selecting the spindle number and the rotational speed.

<Adhesion and Adhesion Durability>

(1) Preparation of Test Pieces

A specimen for adhesion test was fabricated in accordance with the method specified in JIS A1439. Specifically, the polyorganosiloxane composition was filled between two aluminum plates (aluminum adherends specified in JIS H4000: A5052P: 50 mm×50 mm×5 mm thickness), and was thermally cured at 120° C. for 1 hour to give a specimen (also called "H-shaped specimen"). The size of the adhesive layer was 12 mm×12 mm×50 mm.

(2) Adhesion Test and Evaluation of Adhesion Durability (2-1) Adhesion Durability Spacers were attached to both sides of the adhesive layer (the cured product of the composition) of the specimen to keep the two aluminum plates parallel to each other. A 20% strain was then applied in a direction stretching the adhesive layer to pull the aluminum plates away from each other. The durability of the adhesive layer was then examined. The unit was left at room temperature for 1 day or was subjected to a thermal cycle test between −40° C. and 125° C. (the temperature was raised and lowered between the lowermost and uppermost temperatures in 10 to 15 minutes and held at each of the lowermost and uppermost temperatures for 30 minutes) (Thermal Shock Chamber manufactured by ESPEC CORP.).

The state of the specimen was evaluated before the cycle test (after left at room temperature for 1 day) and after predetermined test cycles (100, 500 and 1000 cycles) in accordance with the following criteria.
⊚: No abnormality
×: Cracks (tearing) occurred near the interface between the adhesive layer and the substrate.

(2-2) Adhesion (Breaking Test)

The test pieces free from abnormality after 1000 thermal cycles were broken with an autograph to evaluate the adhesion of the adhesive layer. The breaking test was performed using an autograph (manufactured by Shimadzu Corporation) in accordance with JIS A1439 to determine how the cured product was broken.
○: The cured product was broken and remained attached to 100% of the surface of the test piece to which the cured product had adhered.
×: The cured product was detached from the test piece without any residue on the bonding surface of the test piece.

<Complex Elastic Modulus>

The complex elastic modulus of the composition was studied using a dynamic viscoelastometer (ARES-G2 manufactured by TA Instruments Japan). In the study, the composition was cured by increasing the temperature from room temperature to 120° C. (10° C./min, measurement time: 2 hours, 1 Hz, 5% strain), and the complex elastic modulus during the curing process was measured as the elastic modulus [Pa] of the composition.

<Leveling Properties>

1 g of the composition was dropped onto the center of a 50 mm×50 mm glass plate from 1 to 2 cm above the glass plate, and was allowed to stand for 5 minutes and then cured at 120° C. for 1 hour. The diameter and leveling (smoothness) quality of the cured product were evaluated.
○: The cured product was 25 mm or more in diameter and was sufficiently leveled.
×: The cured product was less than 25 mm in diameter or was not sufficiently leveled.

The results are described in Tables 1 and 2.

TABLE 1

|   | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| A-1 | 15 |  | 20 | 25 | 15 |  |  | 15 | 50 | 50 |
| A-2 |  | 10 |  |  | 25 |  | 5 |  | 50 | 50 |
| A-3 | 50 | 15 |  |  |  | 80 | 70 | 85 |  |  |
| A-4 | 35 | 75 | 80 | 75 | 60 | 20 | 25 |  |  |  |
| B-1 | 11.02 | 10.80 |  |  | 4.65 |  |  | 10.99 | 10.64 |  |
| B-2 |  |  | 6.60 |  |  |  |  |  | 10 | 10 |
| C-1-1 | 0.80 | 1.98 |  | 0.47 | 0.80 | 2.14 | 2.59 | 1.28 | 0.2 | 0.8 |
| C-1-2 |  |  | 0.30 |  |  |  |  |  |  |  |
| C-2 | 17.25 | 17.43 | 18.00 | 8.60 | 17.28 |  |  | 12.82 | 4 | 4 |
| D-1 | 3.69 | 3.73 |  |  | 6.15 | 6.11 | 4.40 |  | 4 | 5 |
| D-2 |  |  | 0.80 |  |  |  |  |  |  |  |
| E-1 | 20 ppm |  |  |  |  |  |  | 20 ppm |  |  |
| E-2 |  | 20 ppm |  |  |  |  |  |  | 100 ppm |  |
| F-1 | 1.48 | 2.96 |  |  | 0.16 | 2.20 | 3.85 | 1.28 | 1.50 | 1.5 |
| F-2 | 0.40 | 0.27 | 1.70 | 0.21 | 0.40 |  |  | 0.50 | 0.5 | 0.5 |
| F-3 |  | 0.20 |  |  |  |  |  | 0.50 | 0.5 | 0.5 |
| F-4 |  |  | 0.20 |  |  |  |  |  |  |  |
| G-1 |  |  |  |  |  |  | 0.05 |  |  |  |
| H/VI | 1.3 | 1.3 | 1.1 | 1.0 | 1.7 | 1.9 | 2.4 | 1.5 | 0.50 | 0.83 |
| $H_{C2}/(H_{C1} + H_{C2})$ (%) | 75.91 | 56.46 | 87.00 | 76.29 | 75.91 | 0.00 | 0.00 | 59.26 | 78 | 47 |

TABLE 2

|   |   | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| Viscosity | Component A (Pa·s) | 2.5 | 0.6 | 1.2 | 1.3 | 1.5 | 2.0 | 2.0 | 5.0 | 30.0 | 30.0 |
|  | Composistion (Pa·s) | 3.0 | 0.5 | 0.5 | 1.0 | 3.0 | 3.0 | 4.0 | 3.0 | 40.0 | 38.0 |
| Levelin properties |  | ○ | ○ | ○ | ○ | ○ | ○ | ○ | ○ | x | x |
| Elastic modulus | Pa | 7.0E+05 | 9.0E+05 | 8.0E+05 | 1.0E+05 | 8.0E+05 | 8.0E+05 | 2.0E+06 | 1.0E+06 | 7.0E+05 | 9.0E+05 |
| Adhesion and adhesion durability | 23° C., 1 Day | ⊚ | ⊚ | ⊚ | ⊚ | ⊚ | ⊚ | x | ⊚ | — | — |
|  | 100 Cycles | ⊚ | ⊚ | ⊚ | ⊚ | x | x | — | x | — | — |
|  | 500 Cycles | ⊚ | ⊚ | ⊚ | ⊚ | — | — | — | — | — | — |
|  | 1000 Cycles | ⊚ | ⊚ | ⊚ | x | — | — | — | — | — | — |
|  | Breaking test after 1000 cycles | ○ | ○ | ○ | — | — | — | — | — | — | — |

The abbreviations in Table 1 mean the following.

H/Vi: Ratio (by mol) of the total of the hydrogen atoms bonded to a silicon atom in (C) to the total of the vinyl groups in (A) and the vinyl groups in (B).

$H_{C2}/(H_{C1}+H_{C2})$ (%): Proportion (by mol) of the hydrogen atoms bonded to a silicon atom in (C2) to the hydrogen atoms bonded to a silicon atom in (C).

As clear from Table 2, the polyorganosiloxane compositions of Examples had a low viscosity. Further, the cured products of the polyorganosiloxane compositions of Examples had a low elastic modulus, and were not torn and showed excellent adhesion in the adhesion test.

From the comparison of Examples 1 and 2, the elastic modulus was lowered when the component B-2 was used.

The composition of Comparative Example 1 did not contain the components B and D. Consequently, the cured product could not follow the deformation strain, and failed to maintain the adhesion and was peeled.

The composition of Comparative Example 2 had H/Vi of not less than 1.5 and did not contain the component B. Consequently, the cured product had insufficient strength and was torn.

The composition of Comparative Example 3 had a small content of the component B, and consequently the cured product had insufficient strength and was torn. Further, the composition of Comparative Example 3 had H/Vi of not less than 1.5 and did not contain the component C-2. Consequently, the cured product could not follow the deformation strain, and failed to maintain the adhesion and was peeled.

The composition of Comparative Example 4 had H/Vi of not less than 1.5 and did not contain the component C-2. Consequently, the cured product could not follow the deformation strain, had a relatively high elastic modulus, and failed to maintain the adhesion and was peeled.

The composition of Comparative Example 5 had H/Vi of 1.5 and did not contain the component D. Consequently, the cured product could not follow the deformation strain, had a relatively high elastic modulus, and failed to maintain the adhesion and was peeled.

The compositions of Comparative Examples 6 and 7 did not contain any of the components A-3 and A-4 corresponding to the low-viscosity polyorganosiloxanes (A1). Consequently, the compositions had a high viscosity and were poor in spreadability and leveling properties.

The invention claimed is:

1. An adhesive polyorganosiloxane composition comprising:
   (A) a linear polyorganosiloxane containing 2 or more $R^1$ in the molecule, wherein $R^1$ denotes an alkenyl group, and having a viscosity at 23° C. of 0.1 to 500 Pa·s, wherein the component (A) comprises (A1) a linear polyorganosiloxane containing 2 or more $R^1$ in the molecule, wherein $R^1$ denotes an alkenyl group, and the component (A1) has a viscosity at 23° C. of not less than 0.1 Pa·s and less than 1.0 Pa·s;
   (B) a polyorganosiloxane including a $SiO_{4/2}$ unit and one or more kinds of units selected from the group consisting of $R^3SiO_{1/2}$ units and $R^2SiO_{2/2}$ units, and optionally including an $RSiO_{3/2}$ unit, wherein R is $R^1$ or $R^2$, $R^1$ is as described above, and $R^2$ denotes an unsubstituted or substituted, monovalent hydrocarbon group having no aliphatic unsaturated bonds, at least three groups R in the molecule being $R^1$;
   (C) (C1) and (C2) described below:
      (C1) a polyorganohydrogensiloxane having 3 or more hydrogen atoms bonded to a silicon atom in the molecule; and
      (C2) a linear polyorganohydrogensiloxane having one hydrogen atom bonded to a silicon atom only at both terminals of the molecular chain, and having no aliphatic unsaturated bonds in the molecule;
   (D) a filler;
   (E) a platinum group metal compound; and
   (F) at least two kinds of compounds selected from the group consisting of the following (F1) to (F4):
      (F1) an organosilicon compound having a hydrogen atom bonded to a silicon atom, and a side chain of the following formula (I) bonded to a silicon atom:

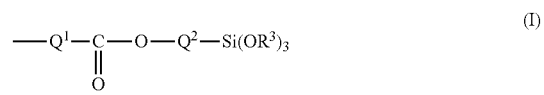

(F2) an organosilicon compound having a $Si(OR^3)_n$ group and an epoxy-containing group, and/or a partially hydrolyzed condensate thereof;
   (F3) a silane compound having a $Si(OR^3)_n$ group and an aliphatic unsaturated hydrocarbon group, and/or a partially hydrolyzed condensate thereof; and
   (F4) an organoaluminum compound;
   wherein: $Q^1$ denotes a linear or branched alkylene group forming a carbon chain having 2 or more carbon atoms between the silicon atom and the ester bond; $Q^2$ denotes a linear or branched alkylene group forming a carbon chain having 3 or more carbon atoms between the oxygen atom and the silicon atom in the side chain; $R^3$ denotes an alkyl group having 1 to 4 carbon atoms or a 2-methoxyethyl group; and n is an integer of 1 to 3;
wherein the ratio (H/Vi) of the total of the hydrogen atoms bonded to a silicon atom in the component (C) to the total of the groups $R^1$ in the component (A) and the groups $R^1$ in the component (B) is not less than 0.2 and less than 1.5;
wherein the proportion of the hydrogen atoms bonded to a silicon atom in the component (C2) is 20 to 99 mol % of the hydrogen atoms bonded to a silicon atom in the component (C);
wherein the content of the component (D) is not more than 20 wt % of the composition; and
wherein the amount of the platinum group metal atoms in the component (E) is 0.1 to 1,000 ppm by weight relative to the total amount of the components (A) and (B).

2. The adhesive polyorganosiloxane composition according to claim 1, wherein the component (C2) is a linear polyorganohydrogensiloxane represented by the general formula (IV):

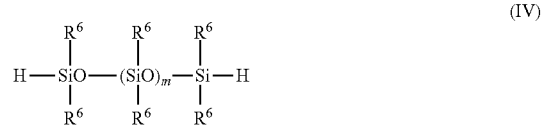

wherein, $R^6$ denotes an unsubstituted or substituted, monovalent hydrocarbon group having no aliphatic unsaturated bonds; and m is such a value that the viscosity of the linear polyorganohydrogensiloxane represented by the general formula (IV) at 23° C. is 0.001 to 10 Pa·s.

3. The adhesive polyorganosiloxane composition according to claim 1, wherein the content of the component (A1) is more than 10 parts by weight and not more than 90 parts by weight based on 100 parts by weight of the total of the component (A).

4. The adhesive polyorganosiloxane composition according to claim 1, wherein the component (A) has a viscosity at 23° C. of 0.1 to 15 Pa·s.

5. The adhesive polyorganosiloxane composition according to claim 1, wherein $R^1$ in the components (A) and (B) is a vinyl group.

6. The adhesive polyorganosiloxane composition according to claim 1, wherein the component (E) comprises at least one selected from the group consisting of platinum-vinylsiloxane complexes and reaction products of chloroplatinic acid with an alcohol.

7. The adhesive polyorganosiloxane composition according to claim 2, wherein the content of the component (A1) is more than 10 parts by weight and not more than 90 parts by weight based on 100 parts by weight of the total of the component (A).

8. The adhesive polyorganosiloxane composition according to claim 2, wherein the component (A) has a viscosity at 23° C. of 0.1 to 15 Pa·s.

9. The adhesive polyorganosiloxane composition according to claim 3, wherein the component (A) has a viscosity at 23° C. of 0.1 to 15 Pa·s.

10. The adhesive polyorganosiloxane composition according to claim 7, wherein the component (A) has a viscosity at 23° C. of 0.1 to 15 Pa·s.

11. The adhesive polyorganosiloxane composition according to claim 2, wherein $R^1$ in the components (A) and (B) is a vinyl group.

12. The adhesive polyorganosiloxane composition according to claim 3, wherein $R^1$ in the components (A) and (B) is a vinyl group.

13. The adhesive polyorganosiloxane composition according to claim 4, wherein $R^1$ in the components (A) and (B) is a vinyl group.

14. The adhesive polyorganosiloxane composition according to claim 7, wherein $R^1$ in the components (A) and (B) is a vinyl group.

15. The adhesive polyorganosiloxane composition according to claim 2, wherein the component (E) comprises at least one selected from the group consisting of platinum-vinylsiloxane complexes and reaction products of chloroplatinic acid with an alcohol.

16. The adhesive polyorganosiloxane composition according to claim 3, wherein the component (E) comprises at least one selected from the group consisting of platinum-vinylsiloxane complexes and reaction products of chloroplatinic acid with an alcohol.

17. The adhesive polyorganosiloxane composition according to claim 4, wherein the component (E) comprises at least one selected from the group consisting of platinum-vinylsiloxane complexes and reaction products of chloroplatinic acid with an alcohol.

18. The adhesive polyorganosiloxane composition according to claim 5, wherein the component (E) comprises at least one selected from the group consisting of platinum-vinylsiloxane complexes and reaction products of chloroplatinic acid with an alcohol.

19. The adhesive polyorganosiloxane composition according to claim 7, wherein the component (E) comprises at least one selected from the group consisting of platinum-vinylsiloxane complexes and reaction products of chloroplatinic acid with an alcohol.

\* \* \* \* \*